United States Patent
Forster et al.

(10) Patent No.: US 6,720,865 B1
(45) Date of Patent: Apr. 13, 2004

(54) RESILIENT MEMBER WITH WIRELESS COMMUNICATION DEVICE

(75) Inventors: Ian J. Forster, Essex (GB); Michael G. Ginn, Essex (GB)

(73) Assignee: Marconi Intellectual Property (US), Itasca, IL (US)

( * ) Notice: Subject to any disclaimer, the term of this patent is extended or adjusted under 35 U.S.C. 154(b) by 0 days.

(21) Appl. No.: 09/503,606

(22) Filed: Feb. 11, 2000

(51) Int. Cl.$^7$ .......................... H04Q 5/22; G06K 19/06
(52) U.S. Cl. ...................... 340/10.1; 235/492; 235/375
(58) Field of Search .................. 340/10.1, 10.2, 340/10.31, 10.33, 10.42, 10.4, 10.51, 568.1, 572.7, 572.8; 342/44, 50, 51; 235/385, 492; 482/49; 220/276, 256.1

(56) References Cited

U.S. PATENT DOCUMENTS

| | | | |
|---|---|---|---|
| 3,779,418 A | * 12/1973 | Davis | 220/781 |
| 3,787,993 A | 1/1974 | Lyon | 40/306 |
| 3,817,417 A | * 6/1974 | Edwards | 215/232 |
| 3,930,593 A | * 1/1976 | Ragettli | 220/276 |
| 3,934,749 A | * 1/1976 | Andrulionis | 220/256.1 |
| 4,862,160 A | 8/1989 | Ekchian et al. | 340/825.54 |
| 4,944,363 A | * 7/1990 | Osher et al. | 473/601 |
| 5,190,504 A | * 3/1993 | Scatterday | 482/49 |
| 5,491,483 A | * 2/1996 | D'Hont | 342/42 |
| 5,631,631 A | 5/1997 | Deschenes | 340/572 |
| 5,767,772 A | 6/1998 | Lemaire et al. | 340/571 |
| 5,779,839 A | 7/1998 | Tuttle et al. | 156/213 |
| 5,798,693 A | 8/1998 | Engellenner | 340/505 |
| 5,831,531 A | 11/1998 | Tuttle | 340/572 |
| 5,864,580 A | * 1/1999 | Lowe et al. | 375/222 |
| 5,865,339 A | 2/1999 | Carlson | 220/694 |
| 5,883,376 A | * 3/1999 | Rosch et al. | 235/492 |
| 5,887,176 A | 3/1999 | Griffith et al. | 395/750 |
| 5,936,523 A | 8/1999 | West | 340/545.6 |
| 5,953,682 A | 9/1999 | McCarrick et al. | 702/45 |
| 5,972,156 A | 10/1999 | Brady et al. | 156/280 |
| 6,008,727 A | * 12/1999 | Want et al. | 340/572.1 |
| 6,023,244 A | 2/2000 | Snygg et al. | 343/700 |
| 6,031,459 A | 2/2000 | Lake | 340/572.8 |
| 6,206,282 B1 | * 3/2001 | Hayes, Sr. et al. | 235/375 |
| 6,402,690 B1 | * 6/2002 | Rhee et al. | 600/300 |

FOREIGN PATENT DOCUMENTS

| | | | |
|---|---|---|---|
| DE | 44 46 203 A1 | 6/1996 | |
| DE | 295 04 712 U | 7/1996 | |
| DE | 19646994 A1 | * 5/1998 | G06K/19/077 |
| DE | 197 03 819 C | 8/1998 | |
| DE | 197 03 819 C1 | 8/1998 | |
| FR | 2681972 A | 4/1993 | |
| GB | 974 249 A | 11/1964 | |
| GB | 2 092 096 A | 8/1982 | |
| GB | 2 210 349 A | 6/1989 | |
| GB | 2 293 588 A | 4/1996 | |
| WO | WO 94/05090 | 3/1994 | |
| WO | WO 95/15622 | 6/1995 | |
| WO | WO 99/18000 | 4/1999 | |

* cited by examiner

Primary Examiner—Michael Horabik
Assistant Examiner—William Bangachon
(74) Attorney, Agent, or Firm—Withrow & Terranova PLLC (57) ABSTRACT

An identification device for identifying a container via wireless communication device. The wireless communication device is attached to an elongated, resilient member having a default shape. The member is resiliently deformable from the default shape to conform to at least a portion of the container and is attached by the resiliency of the member. The containers may move through at least one interrogation point containing an interrogation reader that establishes communication between the identification device and an interrogation reader for monitoring the container.

22 Claims, 6 Drawing Sheets

RESILIENT MEMBER WITH WIRELESS COMMUNICATION DEVICE

BACKGROUND OF THE INVENTION

The present invention relates generally to a device for monitoring the location of a container and, more particularly, to an identification device mounted to a resilient member for attachment to a container.

BACKGROUND OF THE INVENTION

It is often necessary to monitor the location and movement of materials within a distribution center or manufacturing facility. One method of tracking the materials is to attach a wireless communication device such as a radio frequency identification (RFID) transponder or other identification device to containers that are housing the materials. By way of example, a liquid container such as a barrel or keg may include an identification device indicative of the liquid contained inside. A interrogation reader, or series of receivers having an antenna device and able to send information remotely through electronic signals, is placed throughout the distribution or manufacturing facility to receive signals transmitted from the identification devices. The signals are then passed to a central control system that monitors and records the applicable information. The central control system may also send information to its interrogation readers to send to the transponders for response and/or to be stored in the transponder's memory.

The identification system also allows for statistical analysis of the materials to maintain an accurate inventory, production flow rates, and other production standards. Additionally, the identification devices may include specific information about the materials housed within the containers including date of manufacture, place of manufacture, type of product within the container, temperature of the container and ambient air, the temperature of the contents of the container, the pressure of the container, etc.

A problem occurs when the containers are not conducive for mounting an identification device or transponder. One example is a beer keg that has a substantially cylindrical shape with smooth, uniform outer walls. There are no extensions or areas for effectively attaching the identification device. Additionally, these containers may be heavy and cumbersome to handle. During the filling process and distribution, the containers may bang against other containers, storage racks, conveyor equipment, etc. An identification device attached to the container may easily be damaged or destroyed during this process.

Another concern is that the identification devices should be able to be quickly mounted to the containers. Each container should be identified with a separate identification device. The labor cost would be excessive and outweigh the benefits of the identification system if each device was timely to mount to the containers. Therefore, it is important that the identification devices can be quickly attached to each of the individual devices. Inherent with the quick attachment, the devices should be mounted in a straight-forward manner that is not over difficult that require trained personnel or complicated machinery.

In addition to be quickly attached, the identification tags should also securely attach to the containers. Secure attachment should prevent the tags from inadvertently falling off the containers even during handling of the containers during which they may be dropped, bounced around, and otherwise roughly handled.

It is also important that the identification tags be attached in an inconspicuous manner. For reusable containers that are sent to the consumers and then returned to be refilled and redistributed, an inconspicuous placement will help to ensure that the consumers do not tamper with or otherwise destroy the identification tag. An inconspicuous placement, such as within the enclosed rim of a keg, may also help to shield the identification tag from damage while being handled.

SUMMARY OF THE INVENTION

The present invention is directed to an identification device for attachment to a container to identify the container and/or materials there within. The device may be deformed for attachment to a variety of container shapes and sizes, and provides for secure and straight-forward attachment means. In one embodiment, the identification device includes a wireless communication device having identifying indicia for identifying the container. The indicia may identify a variety of values including container contents, temperature, date of manufacturing, etc.

An elongated, resilient member is connected to the wireless communication device for mounting the device to the container. The member has a default shape, and may be deformed from the shape. The resiliency of the member will cause it to return towards the default shape and may conform to at least a portion of the container wherein attachment is caused by the resiliency. Within this embodiment, the member may have a variety of default shapes depending upon the specific application.

The present invention further includes a method of identifying the container by attaching the identification device. The member is deformed from its default shape and positioned against at least a portion of the container. The positioning may include within a rim of the container, around the outer edge of the container, or various other positions. Once in position, the member is released resulting in the member returning towards the default shape. Because it is placed against the container, it cannot fully return to the shape, and the force applied is ample to hold the member and wireless communication device to the container.

The invention further includes monitoring the container through at least one interrogation point containing an interrogation reader. When the container is within range of the interrogation reader, communication is established between the identification device and the interrogation reader. The interrogation reader may receive data from the identification device, or may communicate information that is to be stored in a memory within the device. Additionally, a central control system may be in communication with the interrogation reader to oversee and control container movement throughout a facility.

DESCRIPTION OF THE PREFERRED EMBODIMENTS

Figure 1A:
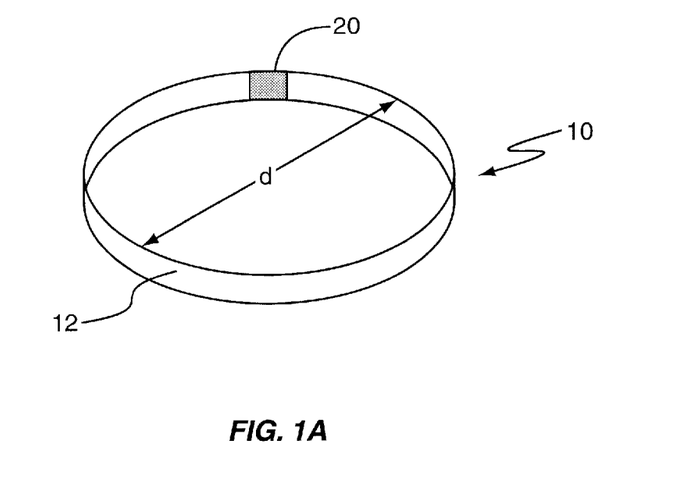
FIG. 1A is a perspective view of the identification device having a resilient member and wireless communication device constructed according to the present invention.

Referring now to the drawings in general in FIG. 1A in particular, it will be understood that the illustrations are for purpose of describing a preferred embodiment of the invention and are not intended to limit the invention thereto. As seen in FIG. 1A, an identification tag, generally designated 10, is shown constructed according to the present invention. The identification tag 10 includes a resilient member 12 with an attached wireless communication device 20.

Figure 1B:
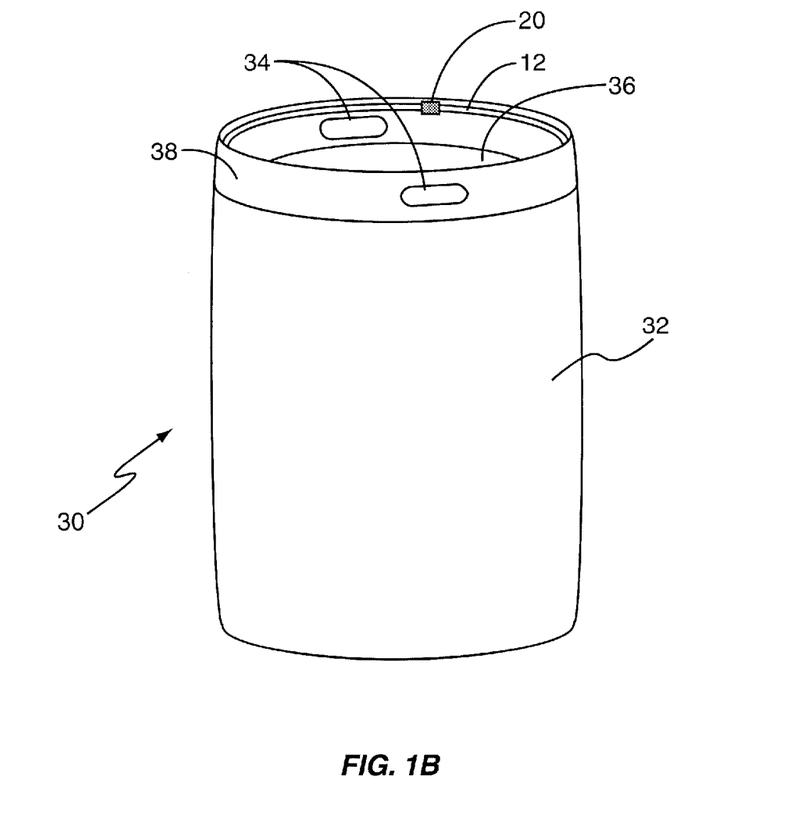
FIG. 1B is a perspective view of the identification device of FIG. 1A mounted within a container.
Figure 4A:
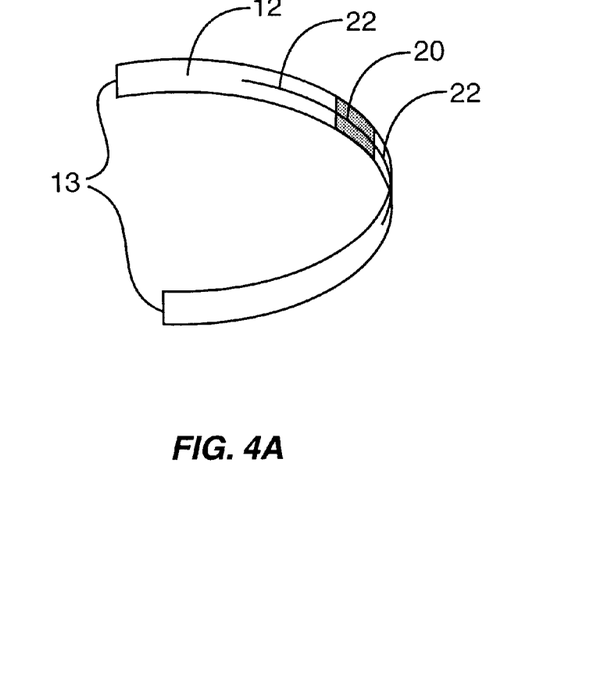
FIG. 4A is a perspective view of an alternative embodiment of the resilient member having an attached wireless communication device.
Figure 4B:
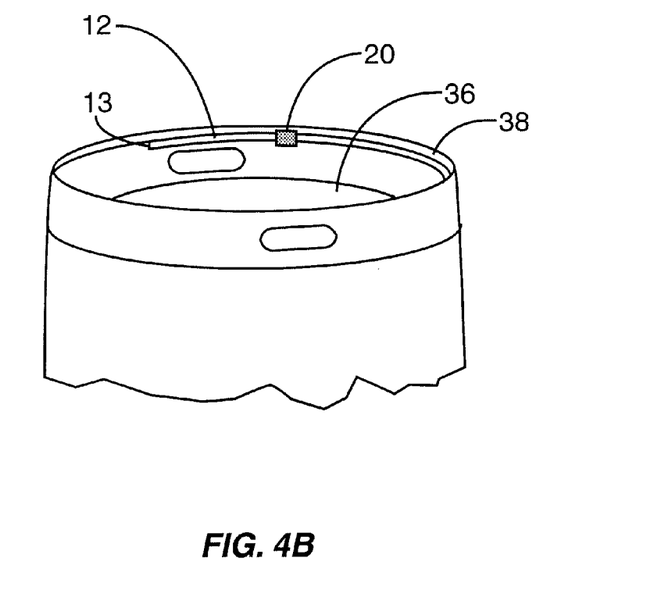
FIG. 4B is a partial perspective view of the device of FIG. 4A mounted within a container.

The resilient member 12 functions to maintain the wireless communication device 20 attached to the container 30. The resilient member 12 may include a variety of shapes and sizes depending upon the dimensions of the container. FIGS. 1A and 1B illustrate the resilient member 12 forming a ring extending a complete 360 degrees. Alternatively, the resilient member 12 may extend a distance less than the entire 360 degrees as illustrated in FIGS. 4A and 4B. In either embodiment, the resilient member 12 may be constructed of an elastic material allowing for the resilient member to stretch around the container and constrict to attach to the container. The resilient member 12 may also be constructed of a more rigid, bendable material that may be compressed to fit inside a rim of the container.

The member 12 is attached to the container by its resiliency. In one embodiment, the member 12 has a default shape that it returns to when no external forces are applied. By way of example, FIG. 1A illustrates a member 12 having a substantially circular default shape having a diameter d. Likewise, FIG. 4A illustrates member 12 having a substantially "U-shaped" member. One skilled in the art will understand that numerous other shapes are available, and are included within the present invention. When the member 12 is deformed from the default shape, the resiliency causes it to return. The force applied by the resiliency of the member 12 returning from a deformed orientation results in attachment to the container 30.

Figure 2:
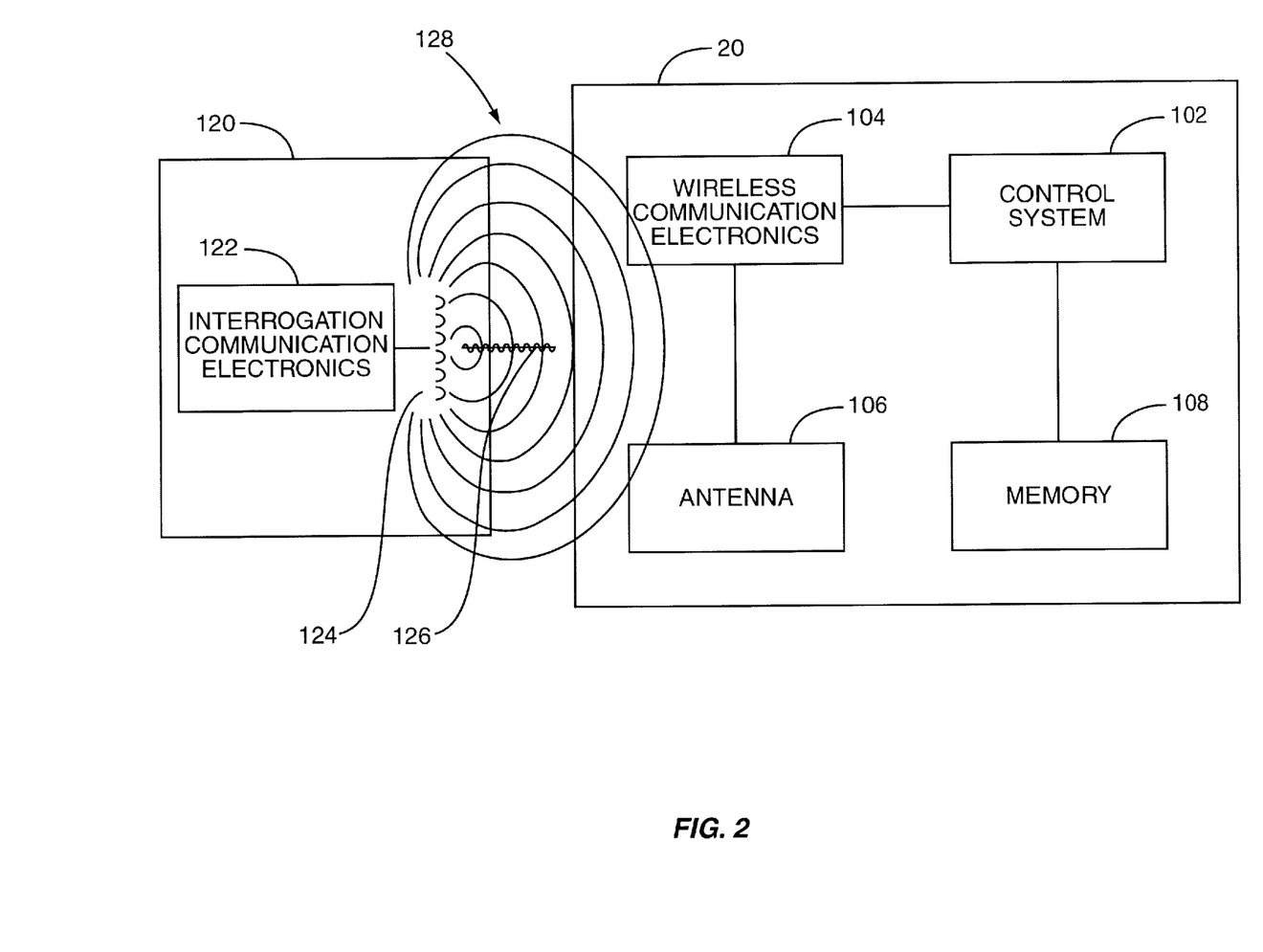
FIG. 2 is a schematic diagram illustrating the communication between the wireless communication device and an interrogation reader.

FIG. 2 illustrates one particular type of wireless communication device 20 called a radio frequency transponder. One of ordinary skill in the art will understand that there are many other different types of wireless identification devices 20 that allow electronic communication and the present invention is not limited to any one particular type. The transponder 20 is usually made out of some type of plastic or other material having within it control system 102, wireless communication electronics 104, antenna 106, and memory 108. The antenna 106 may be either external or incorporated internally to the transponder 20.

The control system 102 is an integrated circuit or other type of microprocessor or micro-controller electronics that controls the substantive operations of the transponder 20. The control system 102 is connected to the wireless communication electronics 104 to communicate and receive transmissions. The control system 102 is also connected to memory 108 for storing information and retrieving information.

FIG. 2 also depicts how communication is achieved with the transponder 20. An interrogation reader 120 contains interrogation communication electronics 122 and an interrogation antenna 124. The interrogation reader 120 communicates to the transponder 20 by emitting an electronic signal or command modulated in a frequency 126 through the interrogation antenna 124. The interrogation antenna 124 may be any type of antenna that can radiate the modulated signal 126 through a field 128 so that a compatible device such as a transponder 20 can receive such signal 126 through its own antenna 106. The field 128 could be any of a variety of different types used in electronic communications including electro-magnetic, magnetic, or electric. The signal 126 is a message containing information and/or specific instructions for the transponder 20. When the transponder antenna 106 is in the presence of the field 128 emitted by the interrogation reader antenna 124, the wireless communication electronics 104 are energized thereby energizing the transponder 20. The transponder 20 remains energized so long as its antenna 106 is in the field 128 of the interrogation reader 120. The wireless communication electronics 104 demodulate the signal 126 and send the message containing information and/or specific instructions to the control system 102 for appropriate actions. For example, the request in the message may be for the transponder 20 to send back information about the materials housed within the container 30 including date of manufacture, place of manufacture, and type of product within the container. The message may also be instructions to send back information regarding the temperature of the container, its ambient air, the temperature of the contents of the container, the pressure of the container, etc. The transponder 20 sends back information to the interrogation reader 120 by altering the contents of the signal 126.

Alternative forms exist for communicating with a wireless electronic device such as a transponder 20. For instance, the transponder 20 may have a transmitter so that it can send information to the interrogation reader without having to use the signal 126 as the means for communication. The transponder 20 may contain a battery to power the transmitter, or an energy storage unit that is charged by the energy when the transponder is in the field 128 of the signal 126. It is understood to one of ordinary skill in the art there are many other manners in which to communicate with a wireless identification device such as a transponder 20, and that the present invention is not limited to the particular manner described above.

Figure 3:
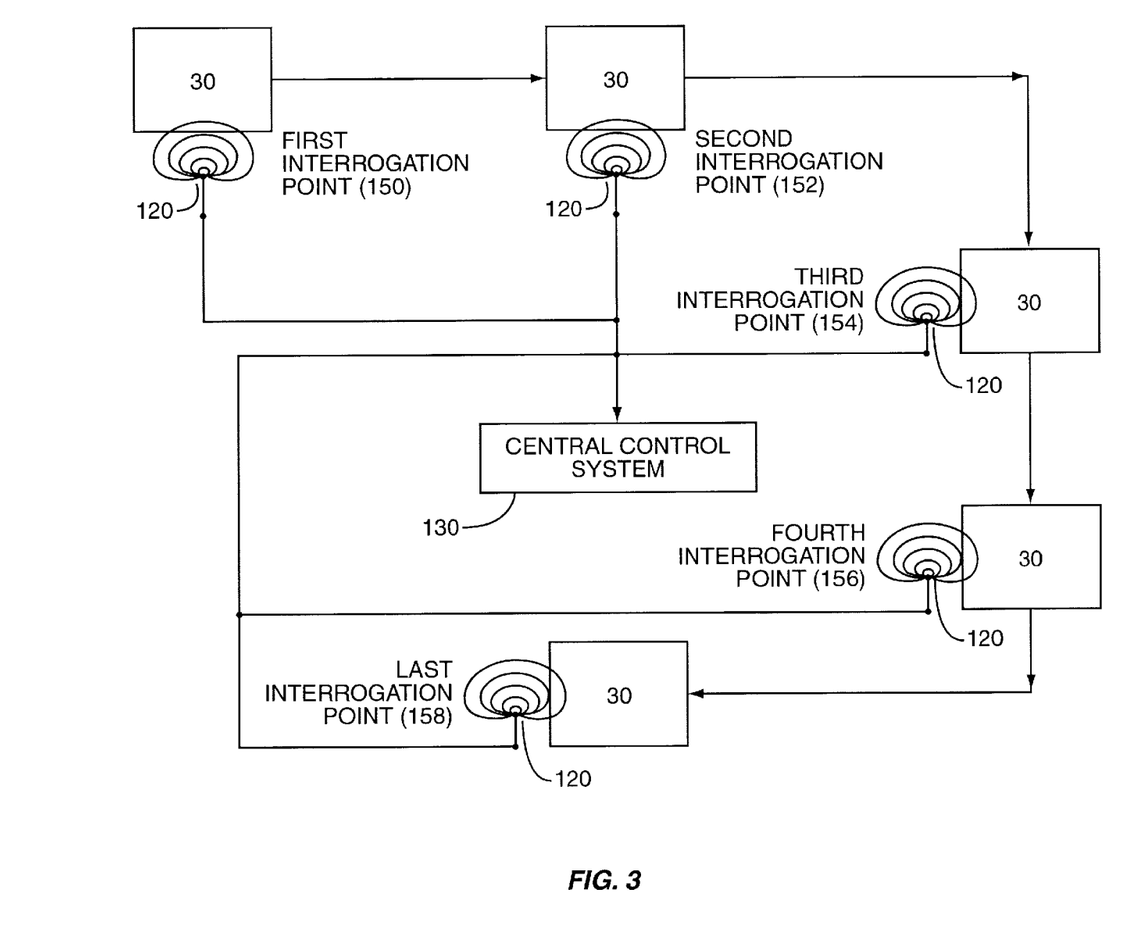
FIG. 3 is a schematic diagram illustrating the tracking and information system for the wireless communication device.

FIG. 3 illustrates a tracking system in which containers 30 containing transponders 20 can be tracked through an environment such as factory or distribution facility. For example, the transponder 20 connected to container 30 could pass a first interrogation point 150 that includes an interrogation reader 120. When the container 30 and its transponder 20 is in the presence of the interrogation reader 120 as described previously, a message containing information and/or a specific request for information may be transmitted by the interrogation reader 120 and received by the transponder 20. This process continues as the container 30 moves to a second interrogation point 152, a third interrogation point 154, a fourth interrogation point 156, and on to a last interrogation point 158.

A central control system 130 maintains the information from the interrogation readers 120 and monitors the movement of the containers 30 through the facility. The information received by each of the interrogation readers 120 may be forwarded to the central control system 130 either through direct wire or LAN connection. The central control system 130 could also send information to the interrogation reader 120 to be transmitted to the transponder 20 for identification purposes. The central control system 130 tracks the expected location of the containers 30 and may be alerted if it expects to receive information about a particular container and does not.

During commissioning of each container 30, it may be necessary to place the container 30 containing the transponder 20 in range of an interrogation reader 120 in order to erase previously stored information in memory 108 or to store particular data or configuration information about the container 30 in memory 108 for later use. Preferably, a separate wireless communication device 20 is preferably mounted on each container 30.

Figure 5:
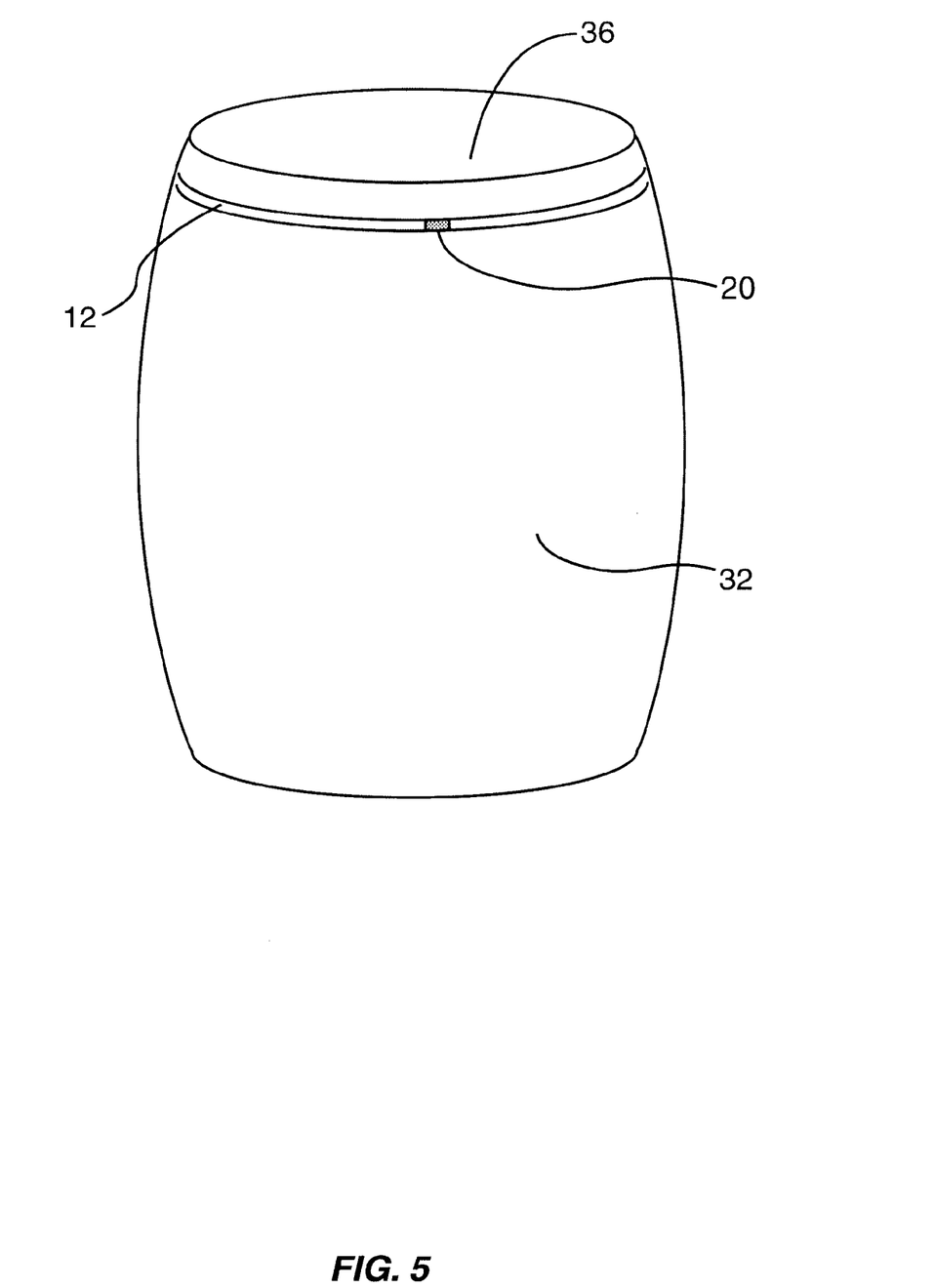
FIG. 5 is a perspective view of an another alternative embodiment having the member with wireless communication device mounted to an outer edge of the container.
Figure 6:
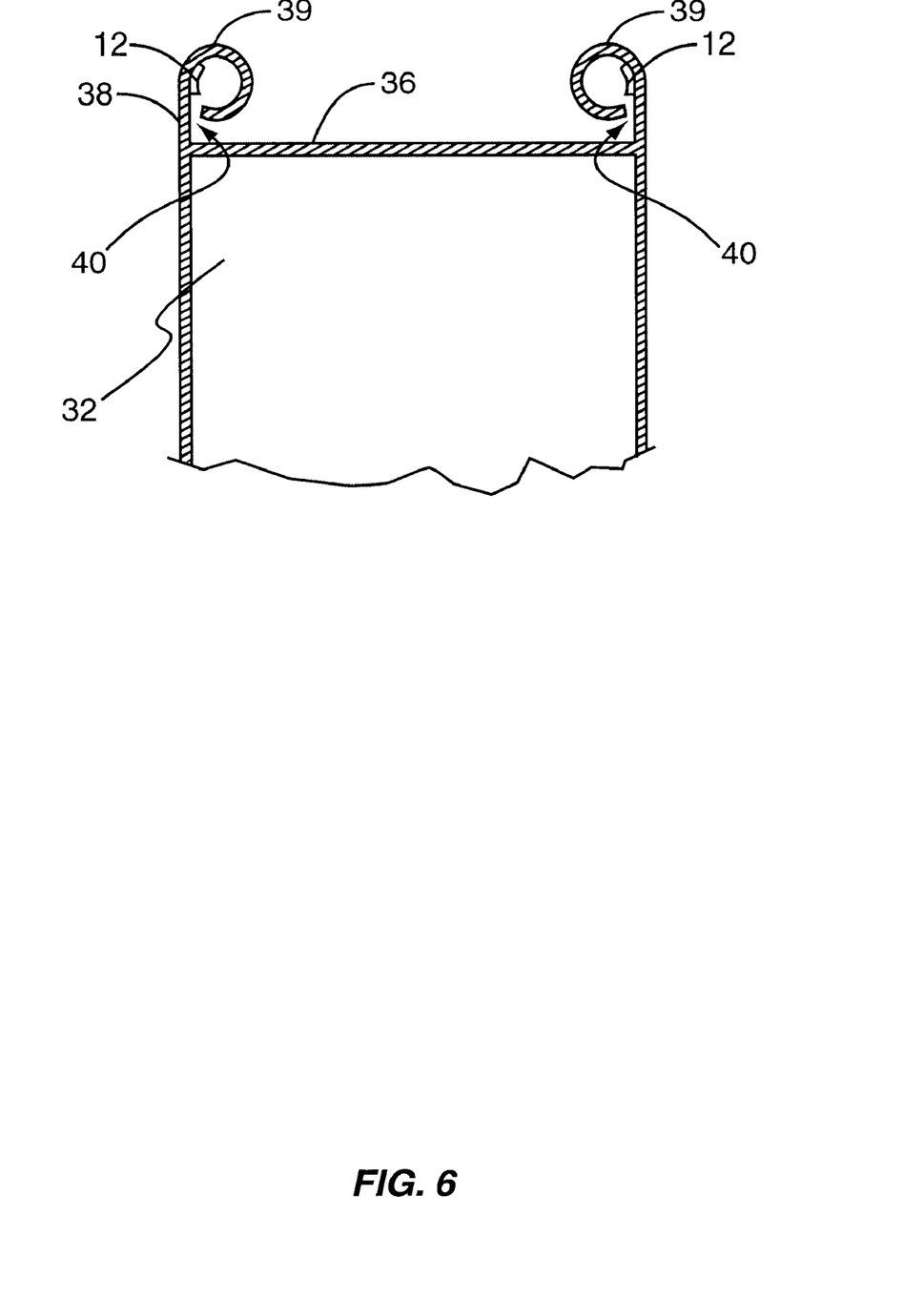
FIG. 6 is a side cross-sectional view of the member and wireless communication device mounted within a rim extending from an end of the container.

The container may have a variety of shapes and sizes. FIG. 5 illustrates one embodiment of a container 30 having a main body 32 for holding materials. A rim 38 extends outwardly from the top surface 36 and includes handles 34 for grasping and carrying the container. As illustrated in FIG. 6, the rim 38 may further include a lip 39 extending around the upper edge having an opening 40 formed between the lip 39 and rim 38. FIG. 5 illustrates another embodiment of a container 30 in which the top surface 36 is flush with the edges of the main body 32 but does not include a rim. Numerous other container shapes are also applicable and contemplated by the present invention.

FIG. 1B illustrates one manner of attaching the identification device 10 to the container 30. Within this embodiment, the resilient member 12 has a ring shape as illustrated in FIG. 1A, with a substantially circular default shape and diameter d. The resilient member 12 is forced or otherwise constricted to fit within the rim 38 of container 30. The rim 38 has a diameter smaller than the diameter d of the resilient member such that once the resilient member is placed within the rim and released, the resilient member 12 will expand to press against the inner edge of the rim. The resilient member 12 illustrated in FIG. 4B is mounted in a similar fashion in which the ends 13 are pressed together to fit the resilient member 12 within the container lip 38 and released thereby expanding outward against the inner edge of the rim 38.

The identification device 10 may also be placed in alternate positions on the container 30. FIG. 5 illustrates the resilient member 12 with wireless communication device 20 positioned on the outer edge of the main container body 32. Within this embodiment, the resilient member 12 preferably includes flexible, elastic material for stretching about the main container body 32 and being released to constrict and hold in position. Preferably, the wireless communication device 20 is mounted on an outer edge of the container 30 in an area that will be protected. By way of example, FIG. 5 illustrates a container 30 having a barrel shape in which the ends have a smaller diameter than a mid-section 31. When the container 30 is moved throughout a facility, the majority of the contact with other containers and machinery will occur at the mid-section 31 and the wireless communication device 20 mounted away from the mid-section will be protected.

FIG. 6 illustrates another manner of attaching the wireless communication device to the container 30. The resilient member 12 is deformed and slid into the openings 40 formed between the rim 38 and lip 39. When released, the resilient member 12 will return towards the default position and hold against the outer edge of the rim 38. This positioning protects the wireless communication device 20 by placing it within the enclosed area and maintains it out of sight of any users. Alternatively, the resilient member 12 may be elastic and expanded to fit inside the rim 38, and when released, contract to be positioned within the edge of the curled lip opposite the rim 38.

In the foregoing description, like-reference characters designate like or corresponding parts throughout the several views. Also, it is to be understood that such terms as "forward", "rearward", "left", "right", "upwardly", "downwardly", and the like are words of convenience that are not to be construed as limiting terms. Certain modifications and improvements will occur to those skilled in the art upon a reading of the foregoing description. The resilient member and/or wireless communication device may be colored to match the container to further aid in hiding these components and prevent tampering by consumers. It should be understood that all such modifications and improvements have been deleted herein for the sake of conciseness and readability but are properly within the scope of the following claims.

What is claimed is:

1. An identification device comprising:
    a wireless communication device having identifying indicia for identifying a container; and
    an elongated, resilient member connected to said wireless communication device for mounting said device to said device to said container, said elongated resilient member adapted to be inwardly deformed from a default shape and returning towards said default shape such that the resilient member presses outwardly to hold the communication device against said container.

2. The device of claim 1, wherein said member has a ring shape.

3. The device of claim 1, wherein said resilient member has a substantially linear shape.

4. The device of claim 1, wherein said identification device includes an antenna and a transponder.

5. The device of claim 4, wherein said antenna is incorporated within said member.

6. An identification system comprising:
    a container having a rim with an interior portion;
    a resilient member adapted to be deformed from a default position and inserted within said interior portion of said rim and returning towards said default position to hold said resilient member against said rim; and
    an identification device attached to said resilient member for positioning on said container, said identification device transmitting information regarding said container.

7. The system of claim 6, wherein said container has a substantially cylindrical shape for containing a material.

8. The system of claim 7, wherein said member is adapted to conform against a rim inner edge.

9. The system of claim 7, wherein said member is adapted to conform to a rim outer edge.

10. The system of claim 7, wherein said container further includes a lip extending from said rim.

11. The system of claim 8, further comprising a receiver for receiving signals transmitted from said identification device.

12. The system of claim 8, wherein said container and said member are the same color.

13. The system of claim 6, wherein the container is a beer keg.

14. An identification device comprising:
    a wireless communication device; and
    means for attaching said wireless communication device within a rim of a beer keg, said attaching means adapted to deform from a default shape for insertion into the rim and return towards the default shape to hold said wireless communication device within rim.

15. A method of identifying a container by attaching a resilient member with an identification device, the method comprising the steps of:

compressing a resilient member from a default shape;

releasing the member against at least a portion of the container;

releasing the member causing it to expand outwardly towards the default shape and attach to the container.

16. The method of claim 15, wherein the resilient member is compressed and placed within an enclosed space on the container and upon releasing the member, expands to contact the enclosed space thereby attaching to the container.

17. The method of claim 16, wherein the container is beer keg.

18. A method of monitoring a container by attaching an identification device and resilient member comprising the steps of:

deforming the resilient member from a default shape and placing the member within a lip of the container;

releasing the member causing it to deform towards the default shape and remain positioned within the lip of the container;

moving the container through at least one interrogation point containing an interrogation reader; and establishing communication between the identification device and the interrogation reader for monitoring the container.

19. The method of claim 12, further including a central control system in communication with said at least one interrogation point for monitoring the movement of the container.

20. The method of claim 19, wherein said identification device includes a memory for storing information regarding the container, and the identification device communicates the information to said at lease one interrogation point.

21. The method of claim 20, wherein the interrogation point delivers information to the identification device which is stored in the memory.

22. The method of claim 19, wherein the interrogation reader obtains information from the identification device selected from the group consisting of date of manufacture, contents of the container, temperature of the contents, and pressure within the container.

* * * * *